Oct. 6, 1931.  W. A. BRECHT  1,826,597
SPRING ELEMENT
Filed July 18, 1928  2 Sheets-Sheet 1
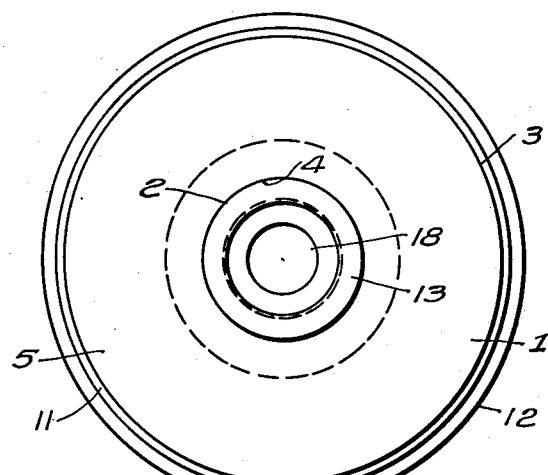
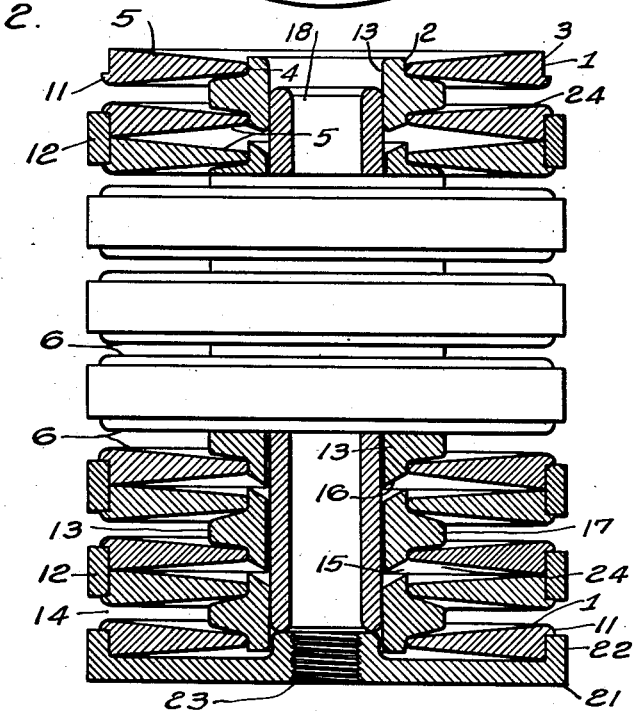
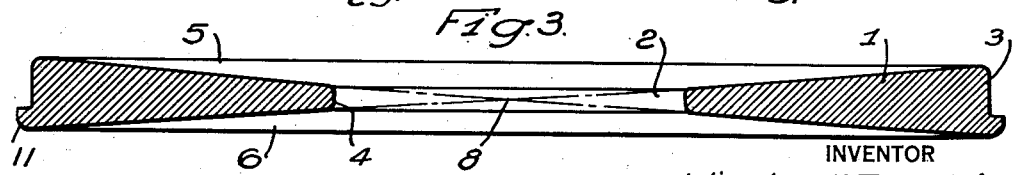
INVENTOR
Winston A. Brecht
BY
ATTORNEY

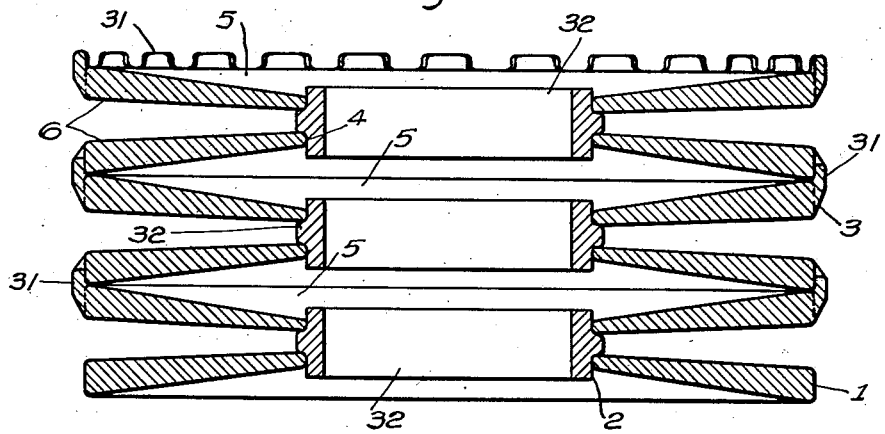
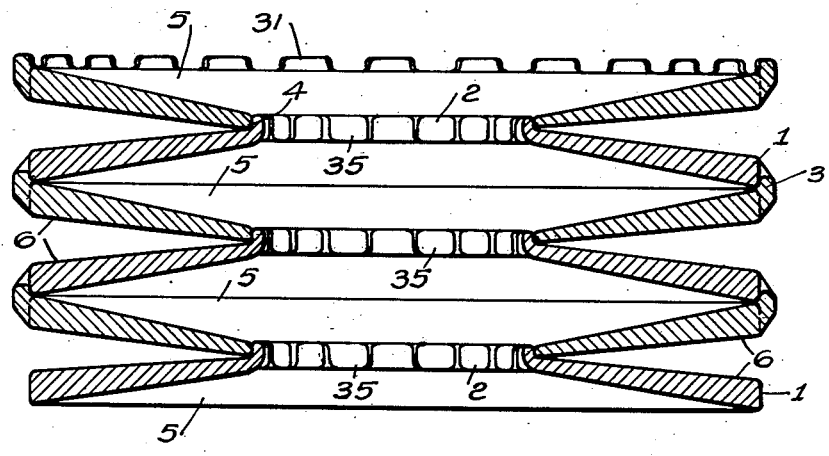
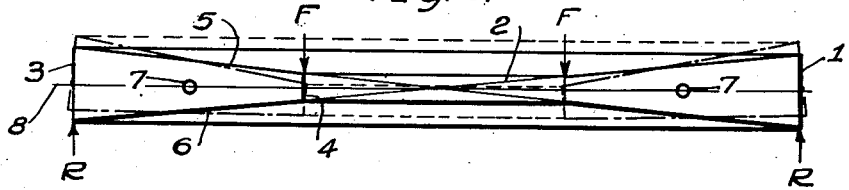

Patented Oct. 6, 1931

1,826,597

UNITED STATES PATENT OFFICE

WINSTON A. BRECHT, OF WILKINSBURG, PENNSYLVANIA, ASSIGNOR TO WESTINGHOUSE ELECTRIC & MANUFACTURING COMPANY, A CORPORATION OF PENNSYLVANIA

SPRING ELEMENT

Application filed July 18, 1928. Serial No. 293,542.

The invention relates, generally, to resilient members and particularly to spring elements which may be grouped to provide any required degree of strength and resiliency.

In the prior art, it was a common practice to utilize helical springs for general applications in which resilient elements were required. However, in some particular applications, for instance, in railway vehicles, it is desirable that spring members of less bulk and greater reliability be substituted for the usual helical spring members.

The present invention provides a spring member which is composed of annular discs of radially tapered cross-section that are uniformly loaded about their freely supported inner edges and outer peripheries. These spring elements and suitable spacing members are stacked in axial alignment to form a spring system of any desired height and resilience. By utilizing spring material formed into discs, in accordance with the invention, it is possible to avoid the difficulties heretofore encountered in heat treating springs, of certain types, such as helical springs.

The relatively thin discs are much more readily quenched than are helical springs, especially when the wire diameter of the helical spring is large in proportion to the diameter of the helix. Further, the conditions of stress which exist in a helical spring, under load, are such that certain surface fibers of the spring material, especially those situated on the inside of the coil, are subject to abnormally high stresses.

In order that helical springs may be designed to have the proper degree of safety, it is necessary that a large portion of the spring material be utilized at stresses very much below the normal working stress. This condition results in an inefficient utilization of the spring material.

It is an object of the present invention to provide a spring member that shall be simple and compact and that shall utilize the spring material in an efficient manner.

Another object of my invention is to provide a spring element which may be readily and economically shaped and heat treated in the manufacturing process.

A further object of my invention is to provide a spring element in which the maximum stresses are uniformly distributed over a relatively large portion thereof.

These and other objects of the invention will become apparent upon studying the following description in conjunction with the drawings in which:

Figure 1 is a plan view of a spring mechanism embodying the invention;

Fig. 2 is a view, partly in side elevation and partly in section, showing the construction of the spring mechanism;

Fig. 3 is a cross-sectional view, on a larger scale, of one element of the spring mechanism;

Fig. 4 is a view, in longitudinal cross-section, of a spring member embodying a modification of the invention;

Fig. 5 is a view, in longitudinal cross-section, of another modification of the invention; and Fig. 6 is a diagrammatic representation of an elementary disc spring member, showing the manner in which deflection takes place under load.

Referring now to Fig. 3, the elementary spring member 1 comprises an annular disc-like member of non-uniform cross-section, its central opening being indicated at 2. As shown in cross section, in Fig. 3, the thickness of the disc 1 tapers from a maximum at its periphery 3 along a radial line to the inner edge 4 which defines the opening 2. In the particular spring illustrated, the lines which define the faces 5 and 6 of the tapered cross-section meet at the geometric center of the circular disc 1. In some instances, however, it may be found desirable to vary the shape of the disc in such manner that the thickness is not in direct proportion to the distance from the center of the disc. The tapered faces 5 and 6 of the disc 1, shown in Fig. 3, may be described as lying in the surfaces of a pair of complementary cones which have their common apex in the geometrical axis of the disc and in its normal central transverse plane.

The spring element 1 is ordinarily loaded in the axial direction by uniformly distributed forces F and R, (Fig. 6) that act in opposite directions upon the spring faces 5 and 6 near the inner edge 4 and the freely supported outer periphery 3, respectively. In order that the inner edge 4 of the spring element 1 may withstand the shearing stresses set up by the force F, the diameter of the central opening 2 is so chosen that the material adjacent to the edge 4 is of adequate thickness.

As shown by means of the broken lines in Fig. 6, when the spring element 1 is loaded uniformly about its outer periphery 3 and inner edge 4, it is distorted from its normal shape. The deflection may be described as a rotation of any given cross-section of the disc 1 about a stationary central point 7. It may be readily seen that such rotation of the cross-section results in reducing the diameter of the disc 1 along its upper face 5 and increasing its diameter along its lower face 6.

Inasmuch as all elementary radial sections of the spring disc 1 rotate an equal amount under the action of the uniformly distributed forces F and R, it is clear that no torsional stresses are set up within the spring material.

Further, it may be seen that, because of the shortening of the diameter of the elements in the face 5, the circumference of the spring, at any given position on the face 5, is also shortened a corresponding amount and, therefore, the material in the face 5 is subjected to circumferential compressive stresses. Similarly, the circumference of the elements in the face 6 is lengthened, and tension stresses are set up within the spring material on this face of the disc.

Further, it may be assumed that the material along the central transverse plane 8 of the disc 1 is not stressed, inasmuch as the diameter of the disc in this plane does not change appreciably when the disc is deflected.

We, therefore, may conclude that the stresses in the spring material range from a maximum in compression on the face 5 to substantially zero stress along the transverse plane 8 and to a maximum in tension along the face 6. Because of the symmetry of the spring element 1, it may be further concluded that the maximum compressive stresses in the face 5 are numerically equal to the maximum tension stresses in the face 6.

In order that the highest degree of material efficiency may be obtained, it is desirable that the stresses in the surfaces 5 and 6 be uniformly distributed. In the particular design shown, the thickness of the disc 1 has been tapered from the outer periphery 3 towards the center in order to accomplish this result. It is apparent that, inasmuch as the deformation and, therefore, the stresses, that are set up in the surfaces 5 and 6, under load, are inversely proportional to the distance from the center of the disc and directly proportional to the axial distance from the transverse plane 8, these two stresses may be made to neutralize each other by varying the thickness of the disc 1 in direct proportion to the diameter in order that the stresses in the surfaces 5 and 6 may be the same at any given position along a diameter.

In order that the discs 1 may be utilized in series or stacked relation, each disc is provided with a radially projecting flange 11 (Figs. 2 and 3) on its outer periphery 3, adjacent to face 6. As shown in Fig. 2, the discs 1 may be placed in pairs, with their faces 5 adjacent, in such manner that the outer edges 3 of the discs engage each other. To maintain the discs 1 in axial alignment, a retaining ring 12 may be fitted about their peripheries 3 between the flanges 11 in such manner that the two springs constitute a double unit which may be loaded by applying uniformly distributed forces in the axial direction to the faces 6 of the springs near the inner edges 4. A spring unit such as described, therefore, has twice the resilience of a single disc and may be contained within a space that is only twice that required for a single disc.

If a spring mechanism of greater resilience is required, it is merely necessary to first select discs 1 which are of sufficient strength to resist the maximum load to which the mechanism may be subjected and group them in pairs by means of retaining rings 12. These pairs of spring elements may then be stacked, as shown in Fig. 2, by interposing suitable spacing members 13 between the adjacent pairs to provide clearance spaces 14 between the outer edges 3. In order to avoid excessively stressing the spring material, the clearance spaces 14 and also clearance spaces 15, which are provided between adjacent spacer members 13, are so proportioned that they will be closed when the spring mechanism is subjected to its normal maximum load.

In case one spring disc of the group shown in Fig. 2 should fail in service, the adjacent spacer members 13 will engage each other, thus closing the clearance space 15 and, by virtue of the fact that the engaging faces 16 of the spacer members 13 are beveled, the axial alignment of the spring elements will be maintained.

Further, it may be seen that failure of one of the spring elements does not in any way affect the remaining spring elements, inasmuch as the load on each is entirely independent of the load on the others. Failure of one spring element will, therefore, simply result in shortening the entire spring mechanism and reducing the resiliency of it.

If it is desired to construct the spring mechanism in such manner that a rising spring characteristic may be obtained, the spacer members 13 may be provided with radially extending ribs or projections 17 that are disposed to engage portions of the faces 6 when the spring is deflected in such manner that the total amount of free spring material is correspondingly reduced and, therefore, the deflection per unit load is made progressively less as the load increases.

The spring mechanism, as thus constructed, possesses a degree of lateral stability, or resistance to loads at an angle to the axis of the spring, that is much greater than the resistance of a helical spring to lateral loads. If still greater lateral stability of the spring mechanism is desired, a guide member or shaft 18 may be inserted within the spacing members 13 in such manner that it constitutes a rigid core upon which the spring elements may be stacked. It is obvious that, by suitably designing the guide member 18, any required degree of lateral stability of the spring mechanism may be obtained.

To provide means for mounting the spring mechanism in an apparatus, such as a railway-vehicle truck, for instance, it may be provided, at the end, with a wearing plate 21 having a flange 22 for encircling one of the spring discs 1 and disposed to engage the flange 11 in the same manner that the retaining ring 12 engages the periphery 3 and flange 11 of a spring disc. The wearing plate 21 is provided, at its center, with a threaded opening 23 into which a bolt, or other suitable device (not shown) may be inserted for the purpose of compressing the spring in order to place it in its normal operating position.

The spaces 24 between the various spring elements 1 of each pair may be partially filled with lubricant for lubricating the various wearing surfaces between the spring elements 1, the spacer members 13 and the guide member 18. It may be readily seen, upon an inspection of the mechanism shown in Fig. 2, that all wearing surfaces are completely enclosed and protected from foreign matter.

In the modification of the spring mechanism shown in Fig. 4, the outer periphery 3 of each spring element 1 is provided with a series of spaced axially extending fingers or lugs 31 that project from its face 5 and are disposed to interlock when a pair of spring elements are fitted with their face 5 together to maintain the elements in axial alignment, in the same manner that the retaining rings 12, shown in Fig. 2, function. As shown, the pairs of springs in this modification are properly separated and aligned by means of cylindrical spacer elements 32, which are similar to the spacer elements 13 shown in Fig. 2. However, in order that the spacer elements 32 may be made relatively small, the spring elements employed are dished or distorted from a transverse plane of symmetry in such manner that the spring faces 6 of adjacent pairs are substantially parallel to each other, under conditions of no load. When the spring elements 1 are shaped in this manner, the faces thereof ordinarily lie in the surfaces of two cones having a common apex and being nested the one within the other.

In order to obtain the best material efficiency and to properly distribute the stresses in the dished disc springs, it may be desirable to so proportion the cross-section that the extended surfaces 5 and 6 intersect in a circle that is approximately one-half the diameter of the opening 2.

It will be noted that, in the spring mechanism shown in Fig. 4, no central guide member is utilized, inasmuch as the spring mechanism has sufficient inherent lateral stability for ordinary purposes. However, it is obvious that, if greater rigidity in the lateral direction is required, it is merely necessary to insert a guide member of the required characteristics through the central openings in the spring discs 1 and the spacer members 32.

In order that the spring elements may be stacked or grouped in such manner that they do not require any auxiliary spacing or guide members, the inner edge 4 of the spring may be provided with axially extending fingers or lugs 35 that extend from the faces 6, as shown in Fig. 5. The lugs 35 are similar to the lugs 31 on the periphery 3 and are disposed to interlock with the lugs on the adjacent spring disc, to provide means for aligning the pairs of spring elements.

In order that the construction shown in Fig. 5 may be successfully utilized, it is necessary that the spring elements 1 be formed in a frusto-conical shape having a somewhat steeper angle than the angle assumed by the faces of the spring elements shown in Fig. 4 to provide clearance spaces between adjacent inner edges 4 and outer edges 3 of the spring element to permit deflection when loaded.

As shown in Fig. 5, each of the discs 1, of which the spring mechanism is composed, is identical with the other discs, and the assembled unit is constructed by stacking each alternate disc with its convex surface extending upwardly and intermediate discs with their convex surfaces extending downwardly. Although the spring mechanism shown in Fig. 5 is very much more simple in construction than the spring mechanism shown in Fig. 2, because of the fact that it is necessary to use a relatively large dish angle in the spring elements, the resiliency of the spring mechanism for a given height is not as great as the resiliency of the mechanism shown in Fig. 2.

From the foregoing discussion, it may be seen that the spring elements constructed in accordance with the invention are superior to the resilient mechanisms utilized in the prior art, for the reason that the spring elements are shaped to utilize the spring material in direct tension and compression, thereby greatly increasing the efficiency of the device. Further, the spring mechanism embodying the invention is much more compact than springs used heretofore and may be readily adjusted in height and resiliency by adding or removing discs.

Although I have shown and described modifications of the spring mechanism embodying my invention, it will be apparent to those skilled in the art that many other modifications may be made in the details of design and in the manner of assembling the spring elements disclosed without departing from the spirit and scope of the invention, as defined in the appended claims.

I claim as my invention:

1. A spring system comprising dish shaped resilient members, each member having a central opening and being provided with fingers on its outer and inner edges, all the members being identical in construction, said resilient members being stacked with their convex sides alternately up and down in such manner that the fingers on the adjoining outer and inner edges interlock to constitute a self-sustaining spring system.

2. A spring comprising pairs of disc-shaped members having central openings, each pair being provided with retaining rings on their outer peripheries, flanges on the discs for retaining the rings in position, said pairs of discs being disposed in axial alignment, a cylindrical guide member disposed within the central openings and spacer members disposed on the guide member for separating the pairs of discs to provide clearances for deflection.

3. A spring comprising discs having central openings, retaining-ring members for engaging pairs of the discs at their peripheries, flanges on the discs for retaining the rings in position, and spacer members for engaging the inner edges of discs in adjacent pairs for the purpose of stacking the pairs in spaced axial alignment to constitute a unitary spring system.

4. A spring element comprising a pair of discs, each disc being thicker at its periphery than at any other portion, a ring for encircling the peripheries of the discs to retain them in axial alignment and flanges on the discs for retaining the ring in position.

5. A spring comprising a plurality of pairs of discs, each disc being thicker at its periphery than at any other portion, a ring for encircling each pair of discs to retain them in axial alignment, flanges on the peripheries of the discs for retaining the ring in position, and spacer members for engaging the inner edges of the discs in adjacent pairs to retain the discs in spaced axial alignment.

6. A spring system comprising disc-shaped resilient members disposed in pairs and in axial alignment, interlocking means disposed at the inner and outer edges of the discs for retaining them in spaced axial alignment, whereby the resilient members deflect upon the application of opposed forces in an axial direction but resist forces at an angle to the axis of the discs.

7. A tapered spring washer having a thickness, at any point, substantially directly proportional to the radial distance of that point from the center of the washer.

8. A tapered spring washer having its tapered faces lying substantially in the surfaces of a pair of complementary cones which have their common apex in the geometrical axis of the washer and in its normal central transverse plane.

In testimony whereof, I have hereunto subscribed my name this 12th day of July, 1928.

WINSTON A. BRECHT.